United States Patent [19]

Strickland, Jr.

[11] Patent Number: 4,566,053

[45] Date of Patent: Jan. 21, 1986

[54] GROUND-FAULT PROTECTIVE RELAY

[75] Inventor: William A. Strickland, Jr., Coral Springs, Fla.

[73] Assignee: Westinghouse Electric Corp., Pittsburgh, Pa.

[21] Appl. No.: 629,532

[22] Filed: Jul. 10, 1984

[51] Int. Cl.[4] .............................................. H02H 3/16
[52] U.S. Cl. ......................................... 361/42; 361/47
[58] Field of Search ....................... 361/42, 44, 47, 48, 361/49, 50, 76

[56] References Cited

U.S. PATENT DOCUMENTS

| | | |
|---|---|---|
| 2,619,522 | 11/1952 | Glassburn . |
| 4,297,740 | 10/1981 | Hagberg ............................... 361/67 |
| 4,347,542 | 8/1982 | Calhoun ................................ 361/76 |
| 4,357,644 | 11/1982 | Schmidt ................................ 361/76 |
| 4,363,066 | 12/1982 | Bishop ................................. 361/85 |

Primary Examiner—Harry E. Moose, Jr.
Attorney, Agent, or Firm—W. E. Zitelli

[57] ABSTRACT

A protective relay for providing an infinitely variable family of curves for use in ground-fault protection. In one embodiment, the protective relay includes a saturable reactor across the output terminals thereof. The saturable reactor impedance varies in accord with the load or fault current such that a trip characteristic based on the zero sequence current and the load or fault current is obtained. The trip characteristic is selected by a potentiometer that limits the amount of dc current to the saturable reactor. Once established by setting the potentiometer, the trip characteristic defines the amount of $3I_O$ neutral current, as a function of three-phase current, necessary to operate the protective relay. Varying the potentiometer setting provides the infinite family of curves.

6 Claims, 4 Drawing Figures

GROUND-FAULT PROTECTIVE RELAY

BACKGROUND OF THE INVENTION

1. Field of the Invention

This invention relates generally to an apparatus for detecting ground faults on a distribution system, and more specifically, to such an apparatus having a variable impedance depending upon load current.

2. Description of the Prior Art

Electrical transmission and distribution lines, station transformers, buses, breakers, motors, and power generators must be protected against insulation deterioration and consequent short circuits that can cause collapse of the power system and serious and expensive apparatus damage. In addition, fault conditions can be caused by lightning or wind forcing trees or branches to contact, and sometimes break, distribution conductors. These broken-conductor faults may cause extended service interruptions and therefore must be detected and repaired.

Most electric utility distribution systems use three-phase four-wire grounded-neutral circuits to supply both three-phase and single-phase-to-neutral loads. These circuits are protected against faults by three-phase circuit breakers at the substation, generally equipped with phase-overcurrent and ground-overcurrent (i.e., zero-sequence or $3I_O$) relays. Ground-overcurrent relay trip settings must allow for normal circuit load unbalances, coordinate with other protective devices, and prevent tripping for large unbalances among each phase-to-neutral load on large in-rush currents during cold-load pickup and normal circuit switching. In some distribution circuits, the unbalanced loads could require a ground relay trip setting as high, or higher than one-half of the phase relay setting. As a result, high-impedance single-phase-to-ground faults, characterized by low fault-current magnitudes, are not generally detectable by overcurrent protective devices commonly used on distribution circuits, because such faults do not produce sufficient current or circuit unbalance during light loading to operate the phase-overcurrent or ground-overcurrent protective relays. Such high-impedance faults may result from the breaking of a conductor that hangs free or contacts a high-impedance surface such as a tree, antenna, dry grass, brush, gravel, concrete, or asphalt. These faults, although not so destructive to the distribution system, may cause extended service interruption and brush fires.

The following U.S. patents, all assigned to the assignee of the present invention, disclose novel apparatus for detecting high-impedance or broken-conductor ground faults on four-wire electrical power distribution systems: U.S. Pat. Nos. 4,297,740, 4,347,542; 4,357,644; and 4,363,066. The apparatus of U.S. Pat. No. 4,297,740 evaluates the zero sequence current on the distribution system to detect a high-impedance fault. The amount of zero sequence current necessary to trip the protective relay is determined by the phase currents or the positive sequence current. U.S. Pat. No. 4,357,644 discloses an electromechanial apparatus to detect high-impedance faults. The operating quantity for this electromechanical apparatus is the zero sequence current. The restraint quantity is developed using a function of any one of the following signals: any two-phase current, the positive sequence current minus the zero sequence current, the three-phase currents, or the positive sequence current. U.S. Pat. No. 4,347,542 discloses an improvement to U.S. Pat. No. 4,357,644 to improve the equality of relay response for a given type of fault for all phase combinations. This improved response is accomplished by modifying the winding arrangement on the magnetic core of the relay. The improved embodiment utilizes the same quantities to form the operating and restraining signals. In U.S. Pat. No. 4,363,066, the operating quantity is a function of the zero sequence current and the restraining quantity is a function of the pre-fault phase current less the zero sequence current. U.S. patent application Ser. No. 528,354 (filed Sept. 1, 1983 and assigned to the assignee of the present invention) also discloses a protective relay apparatus for detecting high-impedance ground faults. This protective relay, intended for three-wire distribution systems, examines the ratio of the positive and negative sequence currents flowing on the distribution system and indicates the occurrence of a fault when the ratio exceeds a predetermined value.

Although the protective relays disclosed in the above-mentioned U.S. patents and application operate satisfactorily, their use results in certain disadvantages related to the cost of mounting and wiring this additional relay in the distribution fault protection circuitry, and coordinating the ground-fault relay with the relays for detecting broken phase conductor faults. The present invention, a relay employing variable impedance, is designed to overcome these disadvantages.

U.S. Pat. No. 2,619,522 discloses a protective relay having a variable operating characteristic depending upon the magnitude of a quantity in the circuit with which it is associated. This protective relay employs a typical operating winding, and restraining windings energized from the operating winding via a saturable transformer. By including an auxiliary overcurrent relay in the circuit of the saturable transformer, the normal operating characteristics of the relay are modified so that at higher current levels, operation is essentially instantaneous.

SUMMARY OF THE INVENTION

The present invention discloses a new protective relay for providing ground-fault protection. The novel protective relay includes a variable shunt impedance so that the current through the overcurrent detector portion of the protective relay depends on the value of the variable impedance. The value of the variable impedance depends on three-phase load or fault current, with the variable impedance value decreasing as the current increases. It is important to recognize that the magnitude of the zero sequence ($3I_O$) neutral current, under the condition of one broken phase conductor is proportional to the magnitude of load current in the sound phase conductors. Also, the load current in all three phase-to-neutral circuits varies in an approximate four to one ratio during a 24-hour period. Therefore, when operating with a prior art fixed-setting $3I_O$ protective relay to detect phase-to-ground faults, the high magnitude of $3I_O$ current is easily detected during peak load periods of the day, but nearly impossible to detect during light load periods. In effect, the present invention provides an infinitely variable family of curves, such that the amount of zero sequence current necessary to trip the relay is dependent on the summation of the three phase currents of the distribution system, as is desirable. The protective relay of the present invention replaces the ground-overcurrent relay used in most distribution circuit protection schemes, and renders unnecessary the high-impedance or broken-conductor ground-fault relay discussed above. That is, the protective relay of the present invention provides both the ground-overcurrent and broken-conductor protection features.

BRIEF DESCRIPTION OF THE DRAWINGS

The invention may be better understood, and further advantages and uses thereof more readily apparent, when considered in view of the following detailed description of exemplary embodiments, taken with the accompanying drawings, in which.

DESCRIPTION OF THE PREFERRED EMBODIMENTS

Figure 1:
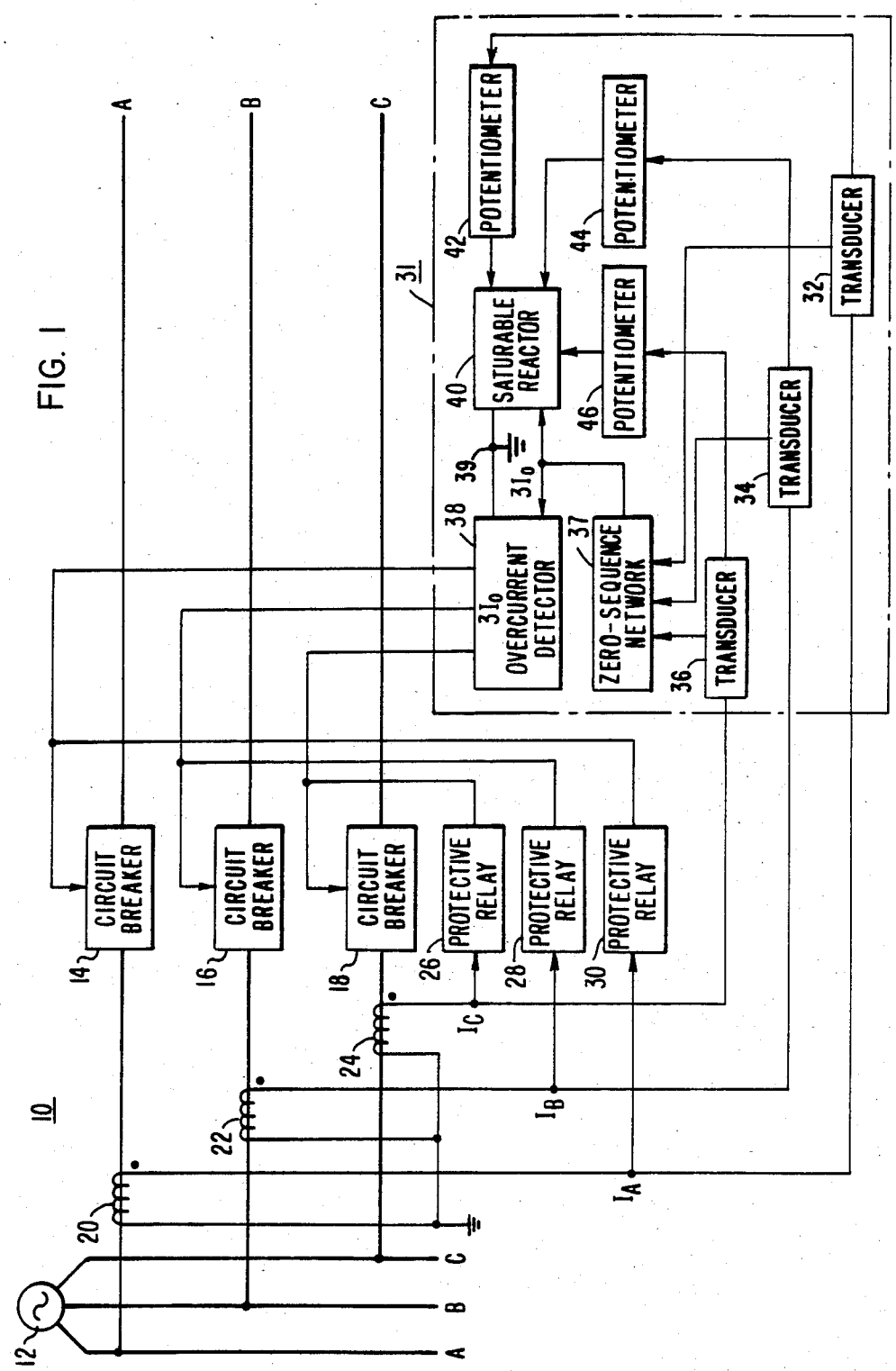
FIG. 1 illustrates a three-phase distribution system including a protective relay constructed according to the teachings of the present invention.

Turning to FIG. 1, there is shown a three-phase electrical power distribution system 10 including an ac source 12 for producing an ac electrical power signal having a frequency of 50 Hz or 60 Hz. The ac source 12 is connected to a phase A conductor, a phase B conductor, and a phase C conductor. The phase A conductor includes a circuit breaker 14, the phase B conductor includes a circuit breaker 16, and the phase C conductor includes a circuit breaker 18. (As is well-known in the art, in another embodiment the circuit breakers 14, 16, and 18 can be replaced with a single three-phase circuit breaker.) A current transformer 20 mounted in proximity to the phase A conductor provides a signal $I_A$ representative of the current on the phase A conductor. A current transformer 22 mounted in proximity to the phase B conductor produces a signal $I_B$ representative of the current on the phase B conductor. A current transformer 24 mounted in proximity to the phase C conductor produces a signal $I_C$ representative of the current on the phase C conductor.

A protective relay 26 is responsive to the signal $I_C$ for detecting a phase-to-phase fault involving the phase C conductor. When a phase-to-phase fault involving the phase C conductor occurs, the protective relay 26 produces a signal that is input to the circuit breaker 18 for opening the contacts thereof. A protective relay 28 is responsive to the signal $I_B$ for detecting a phase-to-phase fault involving the phase B conductor. When such a fault involves the phase B conductor, the protective relay 28 produces a signal for opening the contacts of the circuit breaker 16. Similarly, a protective relay 30 is responsive to the signal $I_A$ and produces a signal to open the circuit breaker 14 when a phase fault involves the phase A conductor.

A protective relay 31, constructed according to the teachings of the present invention, is designed for improved detection of ground faults involving either the phase A, B, or C conductors. The signal $I_A$ is input to a transducer 32 for transforming the signal $I_A$ into a dc signal. The signal $I_B$ is input to a transducer 34 for producing a dc signal representative thereof. The signal $I_C$ is input to a transducer 36 for producing a dc signal representative thereof. The transducers 32, 34 and 36 are included in the protective relay 31. DC signals from the transducers 32, 34 and 36 are input, respectively, to potentiometers 42, 44 and 46. The setting of the potentiometers 42, 44 and 46 control the amount of each dc signal reaching the saturable reactor 40, and thus the impedance thereof. The saturable reactor 40 includes three windings, each one controlled by one of the three dc signals via the potentiometers 42, 44 and 46. The saturable reactor has an impedance dependent on the dc signals input thereto, via the potentiometers 42, 44, and 46.

A zero-sequence network 37 is responsive to ac signals from the transducers 32, 34, and 36 for producing a zero-sequence signal $3I_O$. A $3I_O$ overcurrent detector 38 is responsive to the signal $3I_O$ for detecting ground faults. The saturable reactor 40 is connected in shunt with the $3I_O$ overcurrent detector 38. A terminal 39 is connected to ground. As can be seen, a portion of the zero sequence current from the zero sequence filter 37 is input to the $3I_O$ overcurrent detector 38, and a portion thereof is input to the saturable reactor 40, depending on the impedance of the latter.

The potentiometers 42, 44, and 46 adjust the impedance of the saturable reactor 40 by adjusting the amount of each dc signal reaching the saturable reactor 40, such that for a given value of currents $I_A$, $I_B$, and $I_C$ the impedance of the saturable reactor will be a predetermined value, based on the setting of the potentiometers 42, 44, and 46.

Figure 2:
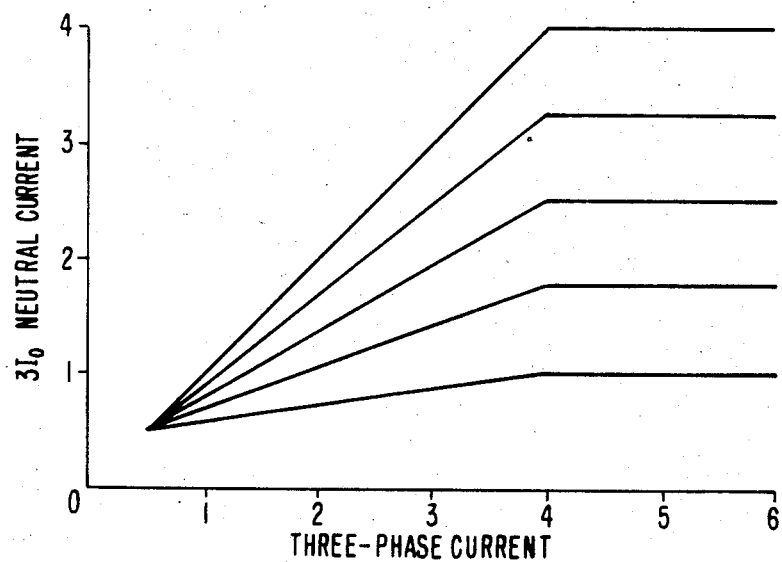
FIG. 2 illustrates a family of characteristic curves for the novel protective relay of FIG. 1.

FIG. 2 illustrates a family of characteristic curves for the protective relay 31. The choice of the desired curve from among the four shown (or any other possible curve) is accomplished by appropriate, and equal, setting of the potentiometers 42, 44, and 46. In another embodiment, the potentiometers 42, 44 and 46 are ganged so that all can be set equally simultaneously. The three-phase load current (X axis) represents the sum of the load or fault currents in the three phase conductors. The protective relay 31 operates when the point on the FIG. 2 graphs established by the intersection of the three-phase current on the (X axis) and the $3I_O$ neutral current (Y axis) is above the chosen characteristic curve. The protective relay 31 restrains when this point is below the chosen curve. In summary, the trip characteristic is selected by the potentiometers 42, 44, and 46, which limit the amount of dc current to the saturable reactor 40. Once established, the trip characteristic defines the amount of $3I_O$ neutral current, as a function of three-phase current, necessary to operate the protective relay 31.

To produce the flat section above a 4 A three-phase current for each characteristic curve, the potentiometers 42, 44, and 46 can each include a zener diode arrangement to limit the dc current into each winding of the saturable reactor 40 and hence limit the minimum impedance of the saturable reactor 40.

For example, in one embodiment of the present invention, (see FIG. 2) assume it is desirable for the $3I_O$ overcurrent detector 38 (a 51N device) to trip when the zero sequence neutral current exceeds 1 A and the three-phase current exceeds 4 A. With the $3I_O$ overcurrent detector 38 set to trip on a zero sequence current in excess of 0.5 A, the saturable reactor 40 must be set such that at 4 A load current, the impedance of the saturable reactor 40 equals the impedance of the $3I_O$ overcurrent detector 38. In this situation, 0.5 A flows through the $3I_O$ overcurrent detector 38, and 0.5 A flows through the impedance of the saturable reactor 40. Now, if the $3I_O$ neutral current exceeds 1 A, one-half of the excess flows through the saturable reactor 40 and one-half flows through the $3I_O$ overcurrent detector 38, causing tripping thereof. If the saturable reactor 40 has an impedance much greater than the impedance of the $3I_O$ overcurrent detector 38 at three-phase current values in the area of 0.5 A, then at these three-phase current values most of the $3I_O$ neutral current flows through the $3I_O$ overcurrent detector 38 and very little flows through the impedance of the saturable reactor 40. These parameters provide a trip characteristic for the protective relay 31 as illustrated in FIG. 2. By adjusting the impedance of the saturable reactor 40, using the potentiometers 42, 44 and 46, a family of curves similar to those illustrated in FIG. 2 can be generated. Thus, the tripping characteristic for the protective relay 31 can be set as desired and changed to provide tripping at the desired values of $3I_O$ neutral current and three-phase current.

Having now discussed the protective relay 31 in detail, the distinct advantages thereof are apparent. It is usually recommended that distribution protection schemes include two relays for most effective ground fault protection: a $3I_O$ ground-overcurrent protective relay and a high-impedance or broken-conductor ground-fault protection device. The present invention provides both of these functions in a single package, thus greatly reducing cost. Users have frequently noted the high cost of installing a broken-conductor detecting ground-overcurrent protective relay in an existing distribution protection system that already includes a ground-overcurrent relay (i.e., a $3I_O$, 51N device) and the difficulty of coordinating the two devices. The present invention overcomes both problems. The present $3I_O$ ground overcurrent plus broken conductor protective relays used for high-impedance ground-fault protection provide characteristic curves based on the user's selection of a particular tap on the relay. In contrast, the protective relay 31 offers an infinitely variable family of curves based on the setting of the potentiometers 42, 44 and 46. On those distribution systems with an overcurrent relay for ground protection, it can be replaced with the protective relay 31 to provide more reliable ground-fault protection, including both $3I_O$ and broken-conductor ground-fault protection. This is a much less expensive approach than adding a broken-conductor ground-fault relay, of the type discussed in the description of the prior art above, to an existing $3I_O$ ground overcurrent protection scheme. Also, the protective relay 31 allows faster tripping at lower zero-sequence currents than the prior art devices, because a long coordinating time delay is not required between a fast $3I_O$ relay and a slower broken-conductor detecting relay. The prior art devices also need at least one extra auxiliary relay to block reclosing of the slow-tripping broken-conductor relay. But, since the protective relay 31 is much faster, due to the variable setting, it can permit multi-shot reclosing and still result in less live, broken-conductor exposure time than the prior arrangement.

Figure 3:
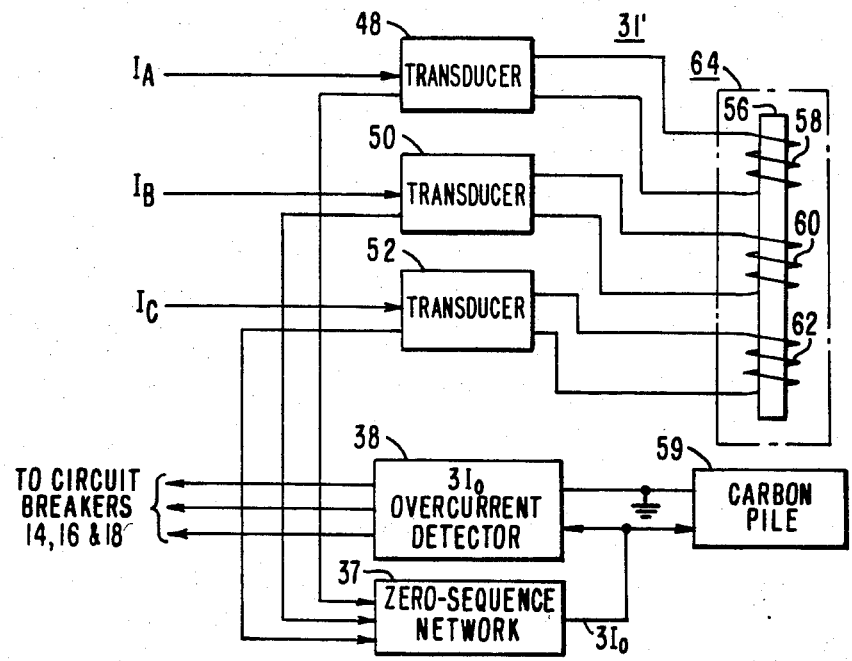
FIG. 3 illustrates a second embodiment of the novel protective relay of FIG. 1.

FIG. 3 illustrates a second embodiment of the protective relay 31 shown in FIG. 1; in FIG. 3, the novel protective relay is designated 31'. The components of FIG. 3 are identical in structure and function to those components bearing identical reference characters in FIG. 1. The signal $I_A$ from the current transformer 20 is input to a transducer 48; the signal $I_B$ from the current transformer 22 is input to a transducer 50; the signal $I_C$ from the current transformer 24 is input to a transducer 52. The transducers 48, 50, and 52 rectify the ac signals input thereto to dc and provide maximum and minimum limits for the dc signals produced. The $3I_O$ overcurrent detector 38 produces three signals for controlling the circuit breakers 14, 16, and 18 (not shown in FIG. 3). A signal from each of the transducers 48, 50, and 52 is input to the zero-sequence network 37 for producing the signal $3I_O$. The signal $3I_O$ is input to the $3I_O$ overcurrent detector 38 and a carbon pile 59. The carbon pile 59 has a variable impedance dependent on the force applied thereto by a plunger 56, and is connected in shunt with the $3I_O$ overcurrent detector 38. The plunger 56 is surrounded by windings 58, 60, and 62. The winding 58 is responsive to the dc signal produced by the transducer 48; the winding 60 is responsive to the dc signal produced by the transducer 50, and the winding 62 is responsive to the dc signal produced by the transducer 52. The plunger 56 and the windings 58, 60, and 62 form a solenoid 64. The solenoid 64 includes stops, not shown in FIG. 3, for limiting the travel of the plunger 56 in both directions. In operation, the dc signals produced by the transducers 48, 50, and 52 cause the plunger to move toward the carbon pile 58 as a function of the magnitude of the dc signals, and therefore as a function of the signals $I_A$, $I_B$, and $I_C$. The force of the plunger 56 on the carbon pile 59 affects the impedance of the latter, controlling the amount of the signal $3I_O$ that is input to the $3I_O$ overcurrent detector 38 and the carbon pile 59. In essence, the carbon pile 59 functions in a manner similar to the saturable reactor 40 shown in FIG. 1.

Figure 4:
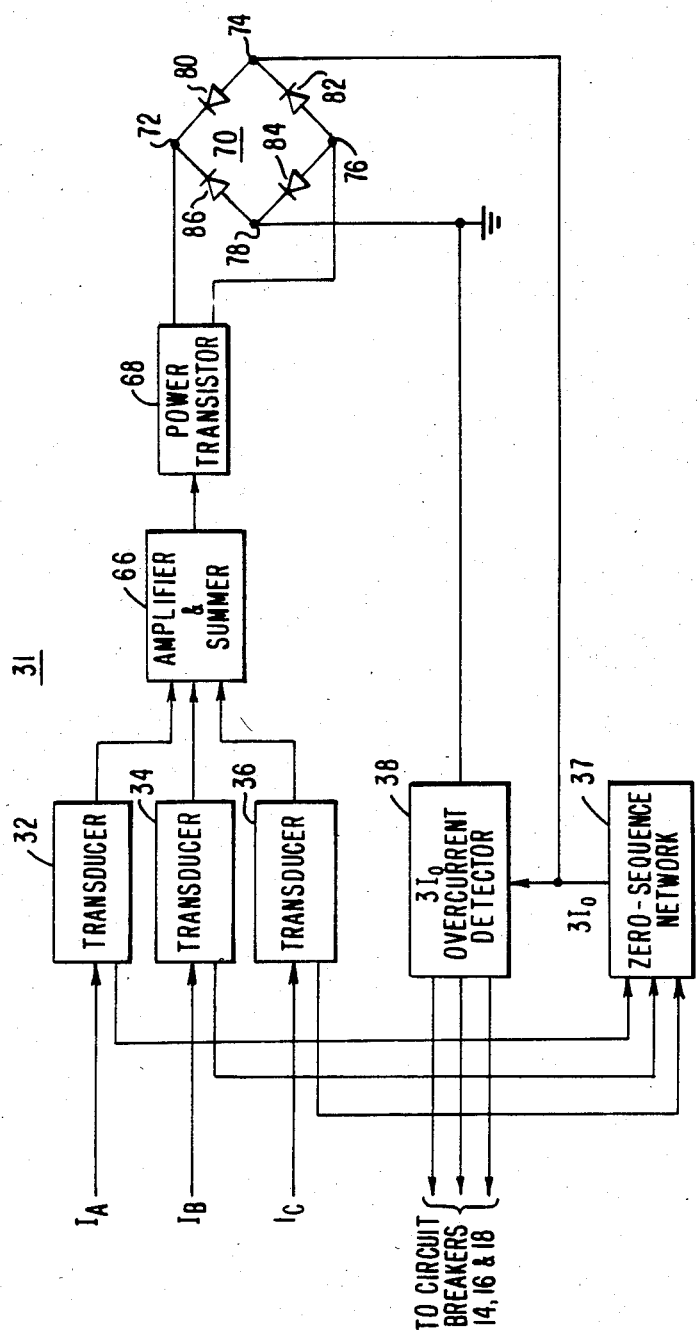
FIG. 4 illustrates a third embodiment of the novel protective relay of FIG. 1.

Turning to FIG. 4, there is shown a third embodiment for the protective relay 31 of FIG. 1. The components of FIG. 4 are identical in structure and function to the components bearing identical reference characters in FIG. 1. The transducers 32, 34, and 36, which produce dc signals representative of the ac signals input thereto include means for limiting the dc signals to a predetermined high limit. The dc signals from the transducers 32, 34, and 36 are input to an amplifier and summer 66. In the amplifier and summer 66 the signals input thereto are amplified and added for input to a power transistor 68 at a base terminal thereof. An emitter terminal of the power transistor 68 is connected to a terminal 72 of a bridge rectifier 70. A collector terminal of the power transistor 68 is connected to a terminal 76 of the bridge rectifier 70. A cathode terminal of a diode 80 is connected to a terminal 72 and an anode terminal thereof is connected to the terminal 74; a cathode terminal of a diode 82 is connected to the terminal 74 and an anode terminal thereof is connected to the terminal 76, an anode terminal of a diode 84 is connected to the terminal 76 and a cathode terminal thereof is connected to the terminal 78; a cathode terminal of a diode 86 is connected to the terminal 72 and an anode terminal thereof is connected to the terminal 78. The terminal 78 is grounded. The diodes 80, 82, 84, and 86 constitute the bridge rectifier 70. A variable impedance, dependent on the signal input to the power transistor 68 is available between the terminals 74 and 78 and shunts a portion of the $3I_O$ signal from the zero-sequence network 37, in a manner similar to the operation of the saturable reactor 40 of FIG. 1.

What is claimed is:

1. A protective relay for detecting ground faults on a three-phase electrical power distribution system with phase conductors A, B, and C, said protective relay comprising:

means for providing an unbalanced current signal representative of unbalanced current in the three-phase electrical power distribution system;

first, second, and third current transformer means for producing first, second, and third current signals representative of the current flowing on the phase conductors A, B, and C, respectively;

overcurrent fault detecting means responsive to said unbalanced current signal for indicating a fault when the unbalanced current exceeds a predetermined limit; and impedance means responsive to said first, second, and third current signals, wherein said impedance means has an impedance dependent on the value of said first, second, and third current signals, and wherein said impedance means is connected in shunt with said overcurrent fault detecting means such said unbalanced current signal is input to said impedance means and said overcurrent fault detecting means, wherein the amount of said unbalanced current signal flowing into said overcurrent fault detecting means depends upon the impedance of said impedance means, and therefore varies as a function of the current flowing through the three-phase electrical power distribution system.

2. The protective relay of claim 1 including means for changing the impedance of the impedance means by controlling the magnitude of the first, second, and third current signals input to the impedance means.

3. The protective relay of claim 1 wherein the impedance means includes:

first, second, and third transducer means responsive to the first, second, and third current signals, respectively, for producing first, second, and third dc signals in response thereto;

saturable reactor means responsive to said first, second, and third dc signals, said saturable reactor means having a controllable impedance dependent on the value of said first, second, and third dc signals:

potentiometer means disposed between said first, second, and third transducer means and said saturable reactor means for adjusting the magnitude of said first, second, and third dc signals input to said saturable reactor means, thereby controlling the impedance of said saturable reactor means; and means for limiting the minimum impedance of said saturable reactor means to a predetermined value.

4. A protective relay for detecting ground faults on a three-phase electrical power distribution system with phase conductors A, B, and C, said protective relay comprising:

means for providing an unbalanced current signal representative of unbalanced current in the three-phase electrical power distribution system;

first, second, and third current transformer means for producing first, second, and third ac current signals representative of the current flowing on the phase conductors A, B, and C, respectively;

overcurrent fault detecting means responsive to said unbalanced current signal for indicating a fault when the unbalanced current exceeds a predetermined limit;

rectifier means responsive to said first, second, and third ac current signals for producing first, second, and third dc signals in response thereto, wherein said first, second, and third dc signals cannot exceed a predetermined maximum value;

dc solenoid means having first, second, and third winding means responsive to said first, second, and third dc signals, respectively, wherein said first, second, and third winding means form a cylindrical cavity having a circular cross section, and wherein a plunger is disposed within said cylindrical cavity for longitudinal movement within said cylindrical cavity in response to the current in said first, second, and third winding means;

carbon pile means disposed proximate said plunger such that the impedance of said carbon pile means is controlled by the force exerted on said carbon pile means by said plunger; and wherein said carbon pile means is connected in shunt with said overcurrent fault detecting means such that said unbalanced current signal is input to said carbon pile means and said overcurrent fault detecting means, wherein the amount of said unbalanced current signal flowing into said overcurrent fault detecting means depends upon the impedance of said carbon pile and therefore varies as a function of the current flowing through the three-phase electrical power distribution system.

5. The protective relay of claim 4 including means for limiting the longitudinal movement of the plunger.

6. A protective relay for detecting ground faults on a three-phase electrical power distribution system with phase conductors A, B, and C, said protective relay comprising:

means for providing an unbalanced current signal representative of unbalanced current in the three-phase electrical power distribution system;

first, second, and third current transformer means for producing first, second, and third current signals representative of the current flowing on the phase conductors A, B, and C, respectively;

overcurrent fault detecting means responsive to said unbalanced current signal for indicating a fault when the unbalanced current exceeds a predetermined limit;

first, second, and third transducer means responsive to the first, second, and third current signals, respectively, for producing first, second, and third dc signals in response thereto;

means responsive to said first, second, and third dc signals for amplifying and summing the signals input thereto and for producing a composite signal representative thereof;

power transistor means having a base terminal responsive to said composite signal;

bridge rectifier means, having first and second diodes connected in series to form a first leg, and third and fourth diodes connected in series to form a second leg, wherein said first and second legs are connected in parallel, and wherein a variable impedance is produced between the junction of said first and second diodes and the junction of said third and fourth diodes; wherein said variable impedance has an impedance dependent on the value of said first, second, and third current signals;

wherein collector and emitter terminals of said power transistor means are connected in parallel with said first and said second legs, and wherein said overcurrent fault detecting means is connected in parallel with the junction formed at the series connection of said first and second diodes and the junction formed at the series connection of said third and fourth diodes, wherein the amount of said unbalanced current signal flowing into said overcurrent fault detecting means depends on the value of said variable impedance, such that indication of a fault depends on the value of said first, second, and third current signals.

* * * * *